United States Patent
Gharst

(10) Patent No.: US 6,737,765 B2
(45) Date of Patent: May 18, 2004

(54) PUNCH AND PRESS SAFETY SYSTEM

(76) Inventor: Thomas Gharst, 14860 Deerwood St., Poway, CA (US) 92064

( * ) Notice: Subject to any disclaimer, the term of this patent is extended or adjusted under 35 U.S.C. 154(b) by 305 days.

(21) Appl. No.: 09/929,732

(22) Filed: Aug. 13, 2001

(65) Prior Publication Data

US 2003/0033942 A1 Feb. 20, 2003

(51) Int. Cl.[7] .............................................. B23P 21/00
(52) U.S. Cl. .......................... 307/326; 72/1; 100/341; 100/342; 192/130; 192/134; 29/708
(58) Field of Search ..................... 192/116.5, 192 R, 192/130, 134; 29/708; 72/21.3, 4, 1; 100/341, 342, 347; 269/23; 307/326

(56) References Cited

U.S. PATENT DOCUMENTS

| | | | |
|---|---|---|---|
| 3,240,310 A | * 3/1966 | Sandeman | 192/134 |
| 4,060,160 A | * 11/1977 | Lieber | 192/134 |
| 4,148,727 A | 4/1979 | Marquardt | 210/33 |
| D265,562 S | 7/1982 | Haeger | 95/128 |
| 4,391,358 A | 7/1983 | Haeger | 192/130 |
| 4,676,421 A | * 6/1987 | Swanstrom | 227/8 |
| 5,191,960 A | 3/1993 | Wareham | 198/391 |
| D361,578 S | 8/1995 | Wareham | D15/128 |
| 5,592,733 A | 1/1997 | Wareham | 29/708 |
| 5,933,941 A | 8/1999 | Kelley | 29/700 |
| 6,021,562 A | 2/2000 | Boster et al. | 29/798 |
| 6,106,446 A | 8/2000 | Kelly et al. | 483/28 |
| 6,195,933 B1 | 3/2001 | Woodruff | 483/28 |

* cited by examiner

*Primary Examiner*—Shawn Riley
(74) *Attorney, Agent, or Firm*—Eastman & Associates

(57) ABSTRACT

A punch and press system includes a low voltage safety circuit and a high voltage control circuit. The high voltage control circuit is further divided into a high voltage low current region and a high voltage high current region. The high voltage low current region is isolated from both the low voltage safety circuit and the high voltage high current region of the control circuit. As the upper tool of the press strikes an object, the object's conductivity will govern whether the press will continue to act on the object. Thus, if the object is conductive, then the upper tool will continue to act on the object. If the object is not conductive, then the upper tool will raise to a neutral position.

12 Claims, 5 Drawing Sheets and a lower tool holder 104. The upper tool holder 102 holds # PUNCH AND PRESS SAFETY SYSTEM

FIELD OF THE INVENTION

The present invention relates generally to an improved safety system for a hydraulic punch and/or press. More specifically, the present invention pertains to an electrical circuit design which provides improved reliability and increased worker safety. This improvement to reliability and safety is obtained through the elimination of the frequent relay terminal failures that occur with the present safety systems.

BACKGROUND OF THE INVENTION

U.S. Pat. No. 4,391,358, issued in 1983 to Virgil Haeger, (the "Haeger patent"), and presented a design for a hardware punch and/or press which included a safety mechanism that prevented an operator's hand or finger from being crushed by the machine when in use. Although the Haeger patent design attempted to remedy a common workplace hazard, the design ultimately failed to realize the level of safety desired. Specifically, due to the relay configuration of the Haeger design, high current loads were passed through a series of low voltage relays resulting in frequent relay failure. A consequence of such relay failures was an unreliable safety system that could potentially lead to the serious injury of a worker. Therefore, there is a need to provide a safety system with excellent reliability due to an improved design of a hydraulic punch and/or press safety system.

SUMMARY OF THE PRESENT INVENTION

The present invention relates to a safety system for a hydraulic punch and/or press. Specifically, the invention includes an interface between a low voltage safety circuit, contained within the press, to the high voltage control circuit of the machine. Electrical continuity in the low voltage safety circuit is required before the high voltage control circuit provides the necessary current to a hydraulic solenoid valve that allows the press to be lowered. If the electrical continuity in the low voltage safety circuit is broken, the downward movement of the punch and/or press will immediately cease. The electrical resistance of an operator's hand or finger is sufficient to break the electrical continuity of the safety circuit, eliminating the risk of injury to the operator.

Interfacing the low voltage safety circuit with the high voltage control circuit presents the difficulty that existing press designs were unable to overcome. The existing presses interface the low voltage safety circuit to the high voltage control circuit through a relay. However, relay failure was frequent as a result of the low voltage relay terminals passing the high current demanded by the hydraulic valve solenoid. Additionally, the safety circuit must operate at low voltage in order to ensure the electrical resistance of an operator's hand or finger will be sufficient to break the safety circuit continuity.

The present invention overcomes the frequent relay failure of existing presses through the incorporation of two (2) high voltage relays into the high voltage control circuit, thereby splitting the high voltage circuit into a low current region and a high current region. This is accomplished by having a low voltage relay that is controlled by the low voltage safety circuit that when actuated, passes a high voltage, low current to actuate an intermediate high voltage, low current, relay. The high voltage low current relay, when actuated, passes a high voltage, high current to the hydraulic valve solenoid to pressurize and activate the press. The high voltage, low current relays are much more capable of reliably passing the current necessary to actuate the high voltage, high current.

DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which.

DETAILED DESCRIPTION OF A PREFERRED EMBODIMENT

Figure 1:
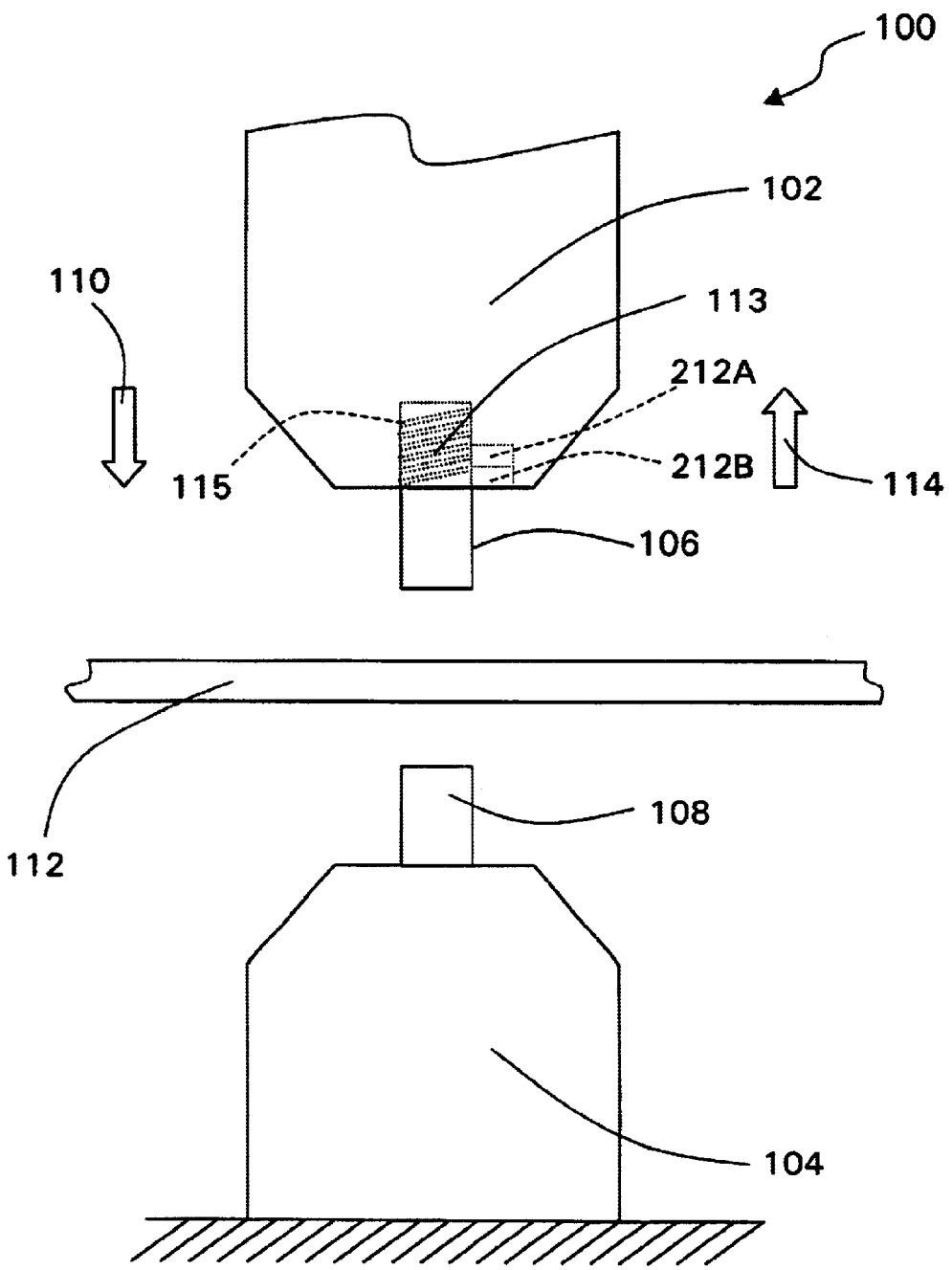
FIG. 1 is a partial front view of a hydraulic punch and/or press with an upper tool holder and upper tool, a lower tool holder and lower tool, and conductive work piece between the upper and lower tools.

Referring initially to FIG. 1, a conventional hydraulic punch and/or press is shown and generally designated 100 and includes an upper tool holder 102, capable of vertical translational movement by a hydraulic system (not shown) the upper tool 106, and the lower tool holder 104 holds a lower tool 108. As the upper tool holder 102 moves in the downward, or press, direction 110, the upper tool 106 and the lower tool 108 act on a work piece 112. Once mechanical contact is made by the upper tool 106 and the work piece 112, the upper tool moves into a small recess 113 compressing spring 115. As will be discussed in more detail below, if the work piece is conductive, the upper tool holder 106 will continue in the press direction 110 until the pressing cycle is complete. Upon completion of the press cycle, the upper tool holder 102 and upper tool 106 move in the up direction 114 and the spring 115 urges the upper tool 106 out of the small recess 113 to its initial position.

Figure 2:
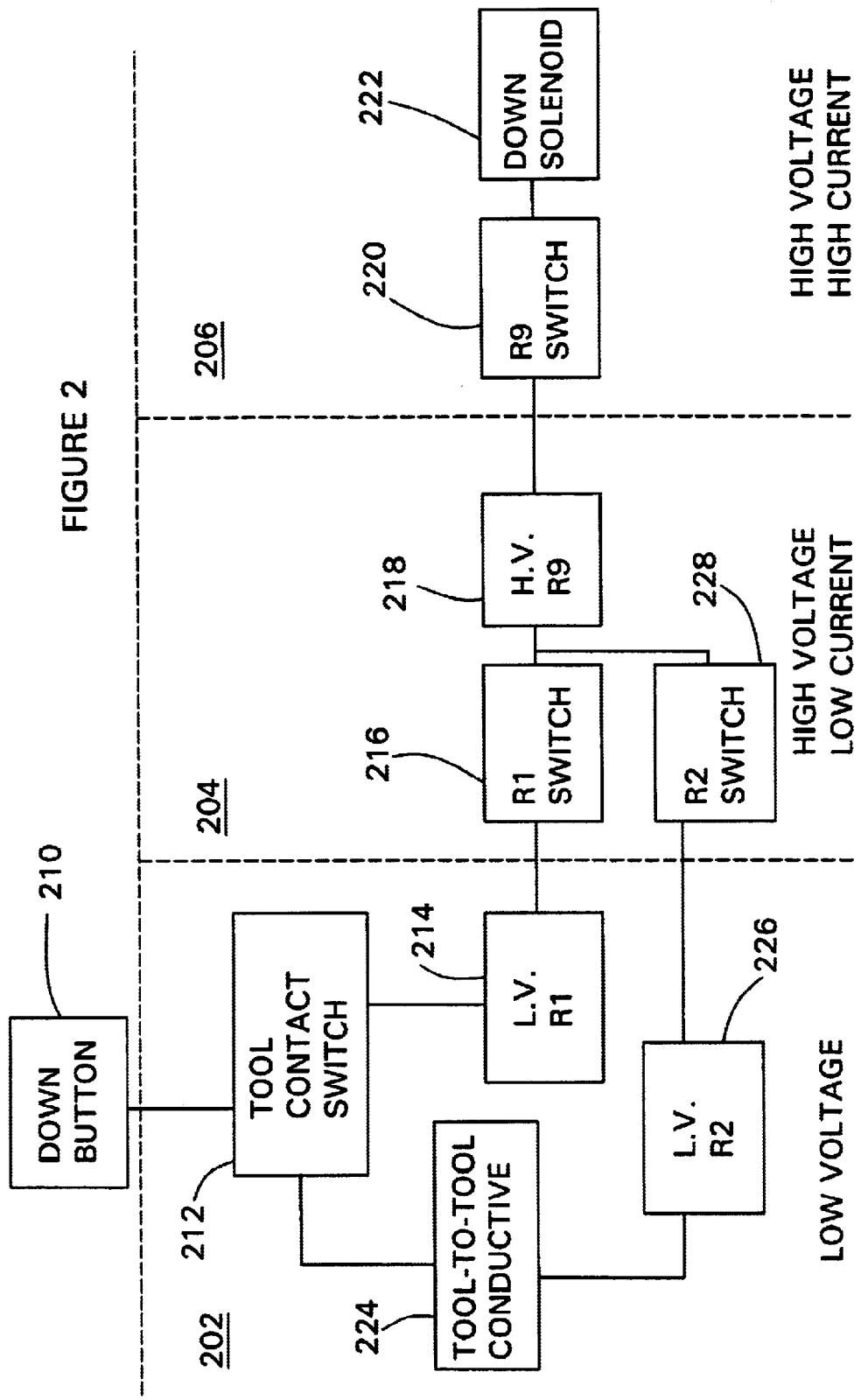
FIG. 2 is a flowchart illustrating the operation of the electrical circuitry of the safety system.

FIG. 2 includes a flowchart, generally designated 200, that illustrates the electrical operating principles of the hydraulic press 100 shown in FIG. 1, configured with the safety system of the present invention. More specifically in FIG. 2, there is a low voltage region 202, a high voltage with low current region 204 and a high voltage with high current region 206.

The operator of the press 100 begins a press cycle by pushing the down button 210 foot switch. Once pushed, down button 210 allows electrical current to flow through the tool contact switch 212 (terminals 212A and 212B in FIG. 1) to the low voltage relay 214. The low voltage relay 214 actuates the low voltage relay switch 216 once current is received from the tool contact switch 212. When the low voltage relay 214 actuates the low voltage relay switch 216, the interface between the low voltage region 202 and the high voltage with low current region 204 is crossed. Current then passes through the low voltage relay switch 216 from the high voltage control circuit (not shown) in the high voltage low current region 204, and enters the high voltage relay 218. The high voltage relay 218 then actuates the high voltage relay switch 220, allowing current to flow in the high voltage with high current region 206 through the high voltage relay switch 220 and to the down solenoid 222. The down solenoid 222 then actuates a hydraulic valve (not shown), which in turn allows pressurized hydraulic fluid (not shown) to actuate the upper tool holder 102 in the press direction 110, as shown in FIG. 1.

The upper tool holder 102 continues in the press direction 112 until the upper tool 106 either strikes the lower tool 108, a work piece 110, or an operator's finger or hand. When the upper tool 106 impacts an object, it displaces into a small recess 113. Once displaced, the electrical continuity maintained between the upper tool holder 102 and the upper tool 106 is broken. This break in electrical continuity is represented by opening of tool contact switch 212. Once the tool contact switch 212 opens, current flow to the low voltage relay 214 ceases. Consequentially, the low voltage relay switch 216 no longer passes current to the high voltage relay 218. No current flow to the high voltage relay 218 causes the high voltage relay switch 220 terminals to open which prevents current from passing to the down solenoid 222, thereby stopping the press.

Once tool contact switch 212 opens, the press stops. However, if tool-to-tool conductivity 224 through the work piece 112 exists, press 100 continues in the press direction 110. If the work piece 112 is conductive, then current in the low voltage region 202 of the safety circuit passes through the low voltage relay 226. Once the low voltage relay 226 is energized, the low voltage relay switch 228 is closed allowing current to flow to the high voltage relay 218. Again, the high voltage relay 218 actuates the high voltage relay switch 220, which then allows current to flow to the down solenoid 222 in the high voltage high current region 206, and the press continues downward.

Figure 3:
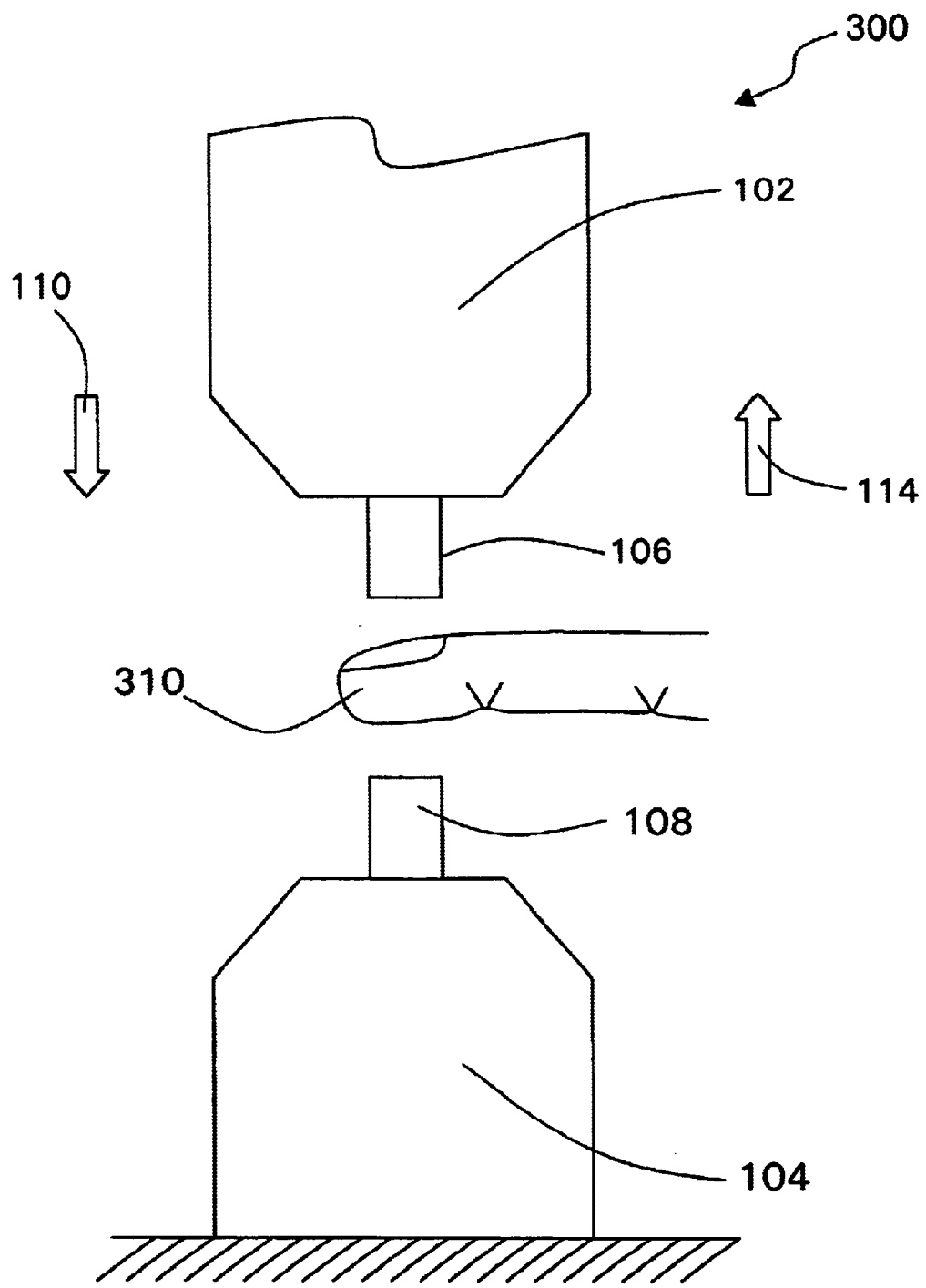
FIG. 3 is a partial front view of a hydraulic punch and/or press with a worker's endangered finger between the upper tool and the lower tool.

FIG. 3 illustrates the same hydraulic punch and/or press as shown in FIG. 1, and is generally designated 300. In FIG. 3, an finger 302 is shown between the upper tool 106 and the lower tool 108. The upper tool holder 102 continues in press direction 110 until the upper tool 106 strikes the finger 302. The force of upper tool 106 striking the finger compresses spring 115 and vertically moves a short distance into the small recess 113 thereby opening the tool contact switch 212. The opening of the tool contact switch 212 cuts current flow to the low voltage relay 214 which in turn de-actuates the low voltage relay switch 216, preventing current flow to the high voltage relay 218. Since the finger 310 is non-conductive, current will not pass to the low voltage relay 226. Therefore, the upper tool holder 102 will not resume it's downward press cycle 110, thus preventing injury to the worker. The amount of force necessary to displace the upper tool 106 into recess 113 is a characteristic of spring 115, but is not harmful to the operator's finger 310.

Figure 4:
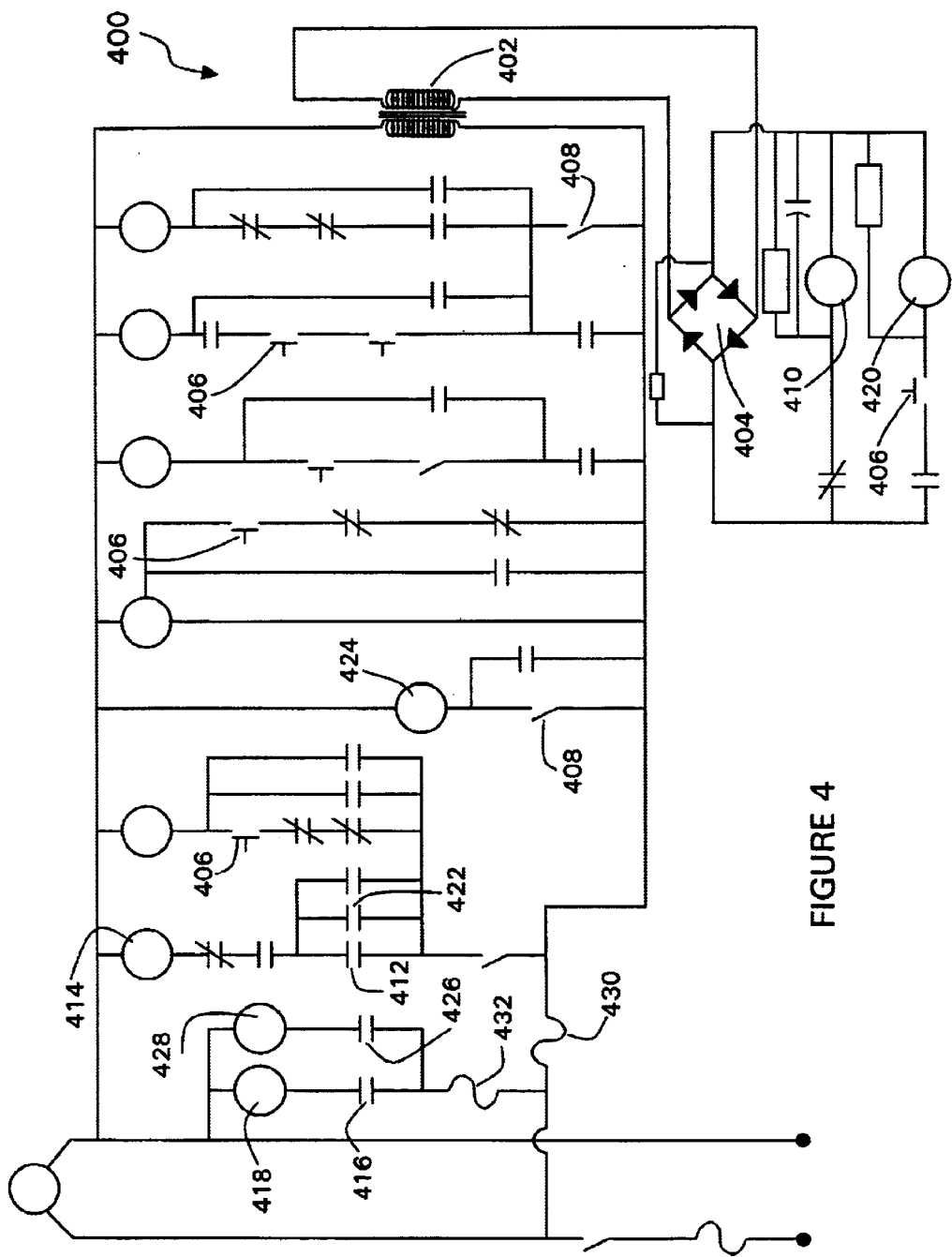
FIG. 4 is an electric circuit diagram of a control circuit of the present invention for use in a hydraulic punch and/or press and includes a low voltage safety system.

FIG. 4 shows a circuit diagram of the control circuit of a press, containing the safety system of the present invention, and is generally designated 400. In FIG. 4, the 6 VDC is generated by passing the 120 VAC through a 20:1 transformer 402, and then through a full-wave bridge rectifier 404. The Mode Selector Switch 406 located in the 120 VAC system turns the safety system on and off. The Foot Switch 408 is located in the 120 VAC system and is used by the operator of the press to raise and lower the upper tool holder 102 and upper tool 106. Once the foot switch is pressed, current flows through low voltage relay 410 in the 6 VDC system (202 in FIG. 2), resulting in relay terminals 412 to close allowing current to pass through relay 414. Current flowing through relay 414 actuates the terminal 416 to close, which in turn allows current to flow to the down solenoid 418. Current to the down solenoid 418 results in the downward movement of the upper tool holder 102 and the lower tool holder 106. The upper tool holder 102 lowers until the upper tool 106 strikes an object, opening the tool contact switch 212. Once the tool contact switch 212 opens, current flow to the relay 410 ceases. Once current is prevented from flowing through relay 410, the relay terminals 412 and subsequently 416 open, and current flow to the down solenoid 418 is interrupted and the press cycle stops.

However, if there is tool-to-tool conductivity 224 between the upper tool 106 and the lower tool 108 through the conductive work piece 112, then current will flow through relay 420, causing terminal 422 to close, thus preserving electrical flow through the relay 414, and further ensuring that the down solenoid will continue through the press cycle in direction 110. If there is no tool-to-tool conductivity 224, then current will not flow through relay 420, and current will be prevented from reaching the down solenoid 418.

If the foot switch 408 is pressed to the raise position, current flows through relay 424 which in turn actuates relay terminals 426. Once the relay terminals 426 are closed, current is allowed to pass through to the up solenoid 428.

The locations of relays 410, 414, 420, 424 and their respective terminals, 412, 416, 422, and 426, are central to the improved reliability of the present invention. Relays 410 and 420 are incapable of reliably passing the heavy current demands of the up and down solenoids through their terminals 412 and 422. Therefore, a three amp fuse 430 is introduced into the circuit to protect against possible overloads resulting from the solenoids, greatly increasing the reliability of the 412 and 422 terminals. Furthermore, the addition of relays 416 and 426 provide for the isolation of the high current demands of the up and down solenoids from the relay terminals 412 and 422. Such isolation is accomplished by locating the relay terminals 416 and 426 in a portion of the circuit where the current is protected by a 10 amp fuse 432. Both the 416 and the 426 relay terminals are capable of passing the higher current demands allowed by the 10 amp fuse 432 without a loss in reliability. The remaining components of the circuit serve to fully operate a hydraulic punch and/or press and are listed in table 1.

Figure 5:
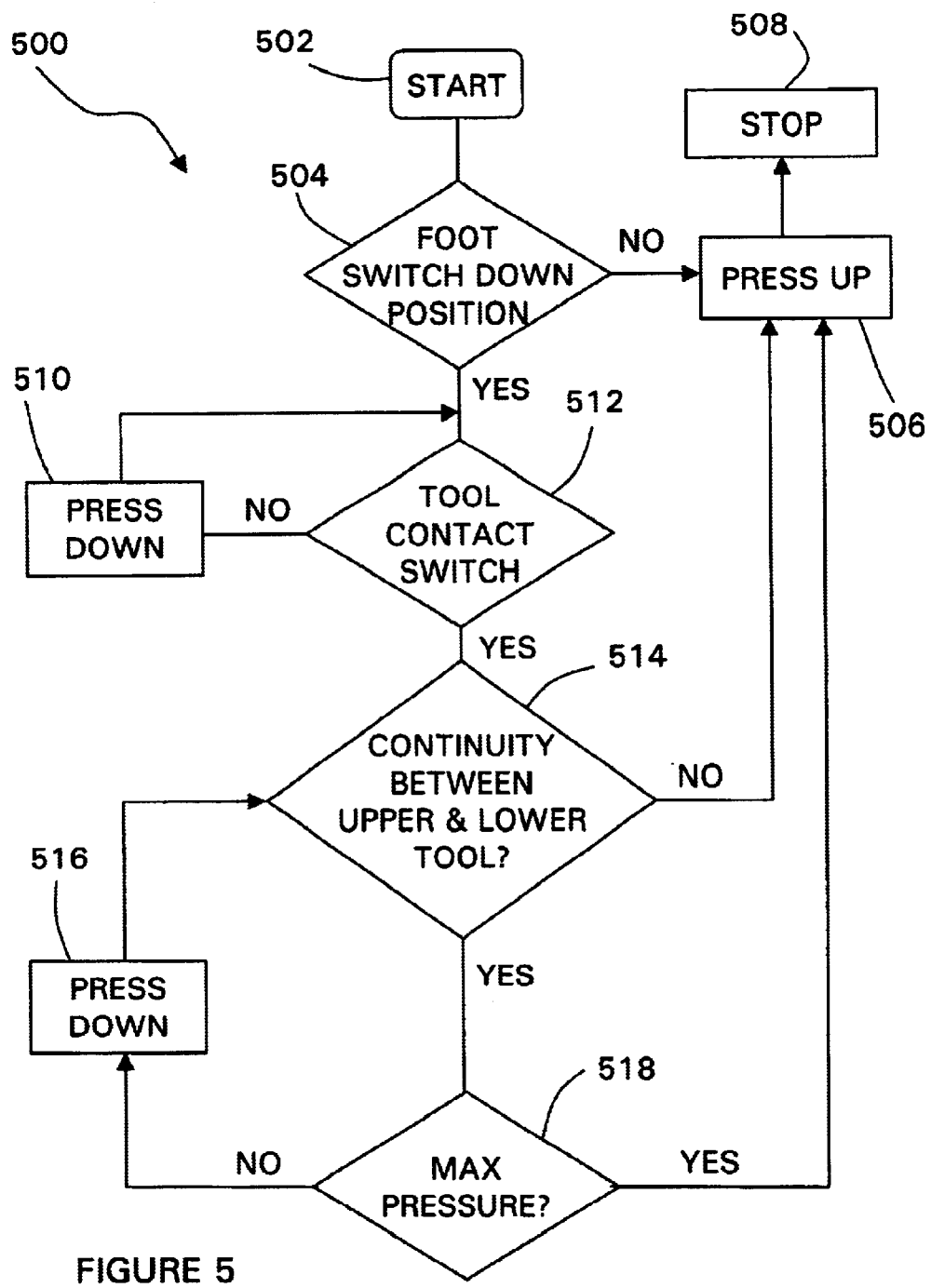
FIG. 5 is a logic diagram illustrating an operating sequence of the present invention.

FIG. 5 is a logic diagram illustrating an operating sequence of the present invention and is generally designated 500. An operator begins a press cycle by first pressing start 502. If the operator does not depress foot switch down 504, then the upper tool holder 102 will press up 506 in the direction 114 until an equilibrium hydraulic pressure is reached at which point the upper tool stops 508. If the foot switch 504 is depressed, then the upper tool holder 102 will being to move down 510 in the press direction 110, so long as the tool contact switch 512 remains closed. The tool contact switch 512 opens when the upper tool 106 strikes an object. If there is no conductivity 514 between the upper tool 106 and the lower tool 108, through the object, then the upper tool holder 102 will press up 506 and then stop 508. However, if there is conductivity 514 between the upper tool 106 and the lower tool 108, through the conductive object, the upper tool holder 102 will continue down 516 until a pre-set maximum hydraulic pressure 518 is reached. Once maximum pressure 518 is reached, the upper tool holder 102 will press up 506 and then stop 508.

While the improved punch and/or safety system of the present invention as herein shown and disclosed in detail is fully capable of obtaining the objects and providing the advantages herein before stated, it is to be understood that it is merely illustrative of a preferred embodiment and an alternative embodiment of the invention and that no limitations are intended to the details of construction or design herein shown other than as described in the appended claims.

TABLE 1

| Name | Type | Name | Type |
|---|---|---|---|
| Relay 1 | 6 VDC Coil | Fuse 2 | 10 amp |
| Relay 2 | 6 VDC Coil | Fuse 3 | 3 amp |
| Relay 3 | 120 VAC Coil | Wire 1 | 50 ohm |
| Relay 5 | 120 VAC Coil | Wire 2 | 50 ohm |
| Relay 7 | 120 VAC Coil | Starter | 120 VAC |
| Relay 8 | 120 VAC Coil | FS | 120 VAC |
| Relay 9 | 120 VAC Coil | MSS | 120 VAC |
| Relay 10 | 120 VAC Coil | Capacitor 1 | 1000 mF |
| Timer Relay 4 | 120 VAC Coil | Capacitor 2 | 680 mF |
| Fuse 1 | 15 amp | | |

I claim:

1. A press comprising:

an upper tool and a lower tool, wherein said upper tool fits in an upper tool holder;

a first low voltage safety circuit wherein said upper tool and said upper tool holder comprise a first electrical switch, said first electrical switch opens when said upper tool strikes an object;

a second low voltage safety circuit wherein said upper tool and said lower tool comprise a second electrical switch, said second electrical switch closes when conductivity exists between said upper tool and said lower tool;

a first high voltage control circuit wherein said first high voltage control circuit is isolated from said first low voltage safety circuit and said second low voltage safety circuit, and wherein either said first low voltage safety circuit or second low voltage safety circuit may switch said first high voltage control circuit; and a second high voltage control circuit wherein said second high voltage control circuit is isolated from said first high voltage control circuit, and wherein said first high voltage control circuit may switch said second high voltage control circuit.

2. The press of claim 1 wherein said first high voltage control circuit is isolated from said first low voltage safety circuit and said second low voltage safety circuit through the use of at least two relays.

3. The press of claim 2 wherein said second high voltage control circuit is isolated from said first high voltage control circuit through the use of at least one relay.

4. The press of claim 1 wherein said second high voltage control circuit is isolated from said first high voltage control circuit through the use of at least one relay.

5. An improvement to a press comprising:

a base structure;

a pedestal assembly on said base structure and including a cantilever arm portion projecting laterally therefrom;

a pressure-exerting ram assembly mounted on said cantilever arm adjacent the free end thereof and including a hydraulic cylinder and a double-acting ram operatively associated therewith and selectively moveable through a predetermined excursion along its longitudinal axis, said ram assembly being electrically insulated from said cantilever arm on which it is mounted;

an anvil mounted on said pedestal and underlying said ram assembly;

an upper tool holder slidably mounted on said ram in electrically conductive interrelation therewith and adapted to removably support a selected upper tool thereon;

a lower tool holder mounted on said anvil in electrically conductive interrelation therewith and adapted to removably support a selected lower tool thereon in cooperative relation to said upper tool; and a control means for normally selectively advancing said ram under a predetermined high hydraulic pressure to bring said upper and lower tools together into a predetermined pressure exerting relationship upon a work piece interposed therebetween with a pressure injurious to the operator if imposed on the operator's hand while automatically stopping advance of the ram if the operator's hand in encountered between the upper and lower tool holders;

said control means including a normally-open safety switch operatively interposed between said ram and said upper tool holder and operable to close a circuit to stop the advance of the ram when a non-conductive element, such as the operator's hand, is encountered with sufficient force to slidably displace said upper tool holder to close said normally-open switch;

said improvement comprising:

a first low voltage safety circuit wherein said upper tool and said upper tool holder comprise a first electrical switch, said first electrical switch opens when said upper tool strikes an object;

a second low voltage safety circuit wherein said upper tool and said lower tool comprise a second electrical switch, said second electrical switch closes when conductivity exists between said upper tool and said lower tool;

a first high voltage control circuit wherein said first high voltage control circuit is isolated from said first low voltage safety circuit and said second low voltage safety circuit, and wherein either said first low voltage safety circuit or second low voltage safety circuit may switch said first high voltage control circuit; and a second high voltage control circuit wherein said second high voltage control circuit is isolated from said first high voltage control circuit, and wherein said first high voltage control circuit may switch said second high voltage control circuit.

6. The improvement of claim 5 wherein said first high voltage control circuit is isolated from said first low voltage safety circuit and said second low voltage safety circuit through the use of at least 2 relays.

7. The improvement of claim 5 wherein said second high voltage control circuit is isolated from said first high voltage control circuit through the use of at least one relay.

8. The improvement of claim 6 wherein said second high voltage control circuit is isolated from said first high voltage control circuit through the use of at least one relay.

9. A press comprising:

an upper tool and a lower tool;

a first electrical switch that opens when said upper tool strikes an object;

a low voltage safety circuit wherein said upper tool and said lower tool comprise a second electrical switch, wherein said second electrical switch closes when conductivity exists between said upper tool and said lower tool;

a first high voltage control circuit wherein said first high voltage control circuit is isolated from said low voltage safety circuit, and wherein either said first electrical switch or said low voltage safety circuit may switch said first high voltage control circuit; and a second high voltage control circuit wherein said second high voltage control circuit is isolated from said first high voltage control circuit, and wherein said first high voltage control circuit may switch said second high voltage control circuit.

10. The press of claim 9, wherein said first high voltage control circuit is isolated from said first low voltage safety circuit and said second low voltage safety circuit through the use of at least two relays.

11. The press of claim 10 wherein said second high voltage control circuit is isolated from said first high voltage control circuit through the use of at least one relay.

12. The press of claim 9 wherein said second high voltage control circuit is isolated from said first high voltage control circuit through the use of at least one relay.

* * * * *